United States Patent [19]
Gamo et al.

[11] Patent Number: 4,467,166
[45] Date of Patent: Aug. 21, 1984

[54] WIRE-CUT ELECTRIC DISCHARGE MACHINING CONTROL METHOD

[75] Inventors: Gotaro Gamo; Mitsuo Kinoshita, both of Hachioji, Japan

[73] Assignee: Fanuc Ltd., Tokyo, Japan

[21] Appl. No.: 385,377

[22] PCT Filed: Oct. 8, 1981

[86] PCT No.: PCT/JP81/00271
§ 371 Date: May 26, 1982
§ 102(e) Date: May 26, 1982

[87] PCT Pub. No.: WO82/01147
PCT Pub. Date: Apr. 15, 1982

[30] Foreign Application Priority Data
Oct. 8, 1980 [JP] Japan .................. 55-141061

[51] Int. Cl.³ .................................. B73P 1/08
[52] U.S. Cl. ...................... 219/69 W; 219/69 M
[58] Field of Search ............ 219/69 W, 69 M, 69 G, 219/69 R

[56] References Cited
U.S. PATENT DOCUMENTS

| | | | |
|---|---|---|---|
| 3,849,624 | 11/1974 | Dulebohn et al. | 219/69 W |
| 4,123,645 | 10/1978 | Shichida et al. | 219/69 W |
| 4,333,806 | 6/1982 | Inoue | 219/69 W |
| 4,363,948 | 12/1982 | Itoh | 219/69 W |

*Primary Examiner*—M. H. Paschall
*Attorney, Agent, or Firm*—Staas & Halsey

[57] ABSTRACT

A wire-cut electric discharge machining control method which enables the corner portion at the intersection of first and second tapered surfaces of a workpiece to be cut into a tapered surface of oblique cylindrical shape. With the present invention, the tapered surface of oblique cylindrical shape is formed between the first and second tapered surfaces by entering command data for the radius r of the oblique cylindrical tapered surface in addition to positional control information for cutting the first and second tapered surfaces, computing a pair of points Q and R where the oblique cylindrical tapered surface meets the first and second tapered surfaces from the positional control information and radius, and cutting the tapered surface of oblique cylindrical shape between the points Q and R.

7 Claims, 9 Drawing Figures

WIRE-CUT ELECTRIC DISCHARGE MACHINING CONTROL METHOD

DESCRIPTION

Background of the Invention

This invention relates to a wire-cut electric discharge machining control method for machining a workpiece by means of a wire-cut electric discharge machine. More particularly, the invention relates to a wire-cut electric discharge machining control method for machining the corner portion between a first tapered surface and a second tapered surface into a tapered surface having the shape of an oblique cylinder.

As is well-known in the art, a wire-cut electric discharge machine has a wire stretched between an upper guide and a lower guide and machines a workpiece by producing an electrical discharge between the wire and the workpiece. The workpiece, fixed on a table, is transported in X and Y directions along a machining contour in response to commands from a numerical control device. When the stretched wire is held normal to the table (workpiece), the upper and lower surfaces of the workpiece will be machined into profiles which are identical. Further, if the arrangement is such that the upper guide can be displaced in the X and Y directions (referred to as the U- and V-axes) to incline the wire with respect to the workpiece such as by displacing the upper guide in a direction at right angles to the direction of workpiece movement, then the upper and lower surfaces of the workpiece will not be machined to the same profile. Instead, the surface machined by the wire will be inclined. This is so-called taper cutting.

FIG. 1 is an illustrative view of such taper cutting, in which a wire WR is stretched between an upper guide UG and lower guide DG at a predetermined angle of inclination with respect to a workpiece WK. If we take the lower surface PL of the workpiece WK as the commanded program profile (the upper surface QU of the workpiece WK may also serve as a programmed profile), and if we let $\alpha$ denote the taper angle, H the vertical distance between the upper guide UG and lower guide DG and h the vertical distance from the lower guide DG to the lower surface of the workpiece WK, then the offset $d_1$ of the lower guide DG and the offset $d_2$ of the upper guide UG with respect to the lower surface PL of the workpiece, may be expressed:

$$d_1 = h \cdot \tan\alpha + \frac{d}{2} \quad (1)$$

$$d_2 = H \cdot \tan\alpha - h \cdot \tan\alpha - \frac{d}{2} \quad (2)$$

$$= H \cdot \tan\alpha - d_1$$

Note that d is the width of the cut.

Thus, if the movement of the upper guide UG from which the wire WR is stretched is so controlled in relation to workpiece movement that the offsets $d_1$, $d_2$ remain constant, then taper cutting at the taper angle $\alpha$ can be carried out, as shown in FIG. 2. The dashed line and one-dot chain line in the Figure indicate the paths of the upper and lower guides UG, DG, respectively.

Corner portions formed by such taper cutting may have various shapes. For example, the corner portion may have an angular contour of one which is continuous and smoothly connected, or may have a tapered surface which is conically shaped.

FIG. 3 is an illustrative view for a case where corner portions are cut to have a conically shaped tapered surface by four-axis taper cutting. In FIG. 3, (a) is a perspective view and (b) is a plan view. These conical tapered surfaces $1a$ through $1d$ are formed by instructing the arc at each corner portion and executing four-axis control on the basis of the arc instructions. Such conical corners are useful when adopted in the relief machining of molds.

The wider utilization of taper cutting in recent years has been accompanied by a demand for a cutting capability which permits tapered surfaces $2a$ through $2d$, in the form of oblique cylinders (cylindroids), to be cut at corner portions, as illustrated in FIG. 4. The oblique cylindrical shape is one which has circular arcs of equal radius in the direction of the height thereof.

The demand for cutting a corner portion to a tapered surface of oblique cylindrical shape did not exist in the past, however, so that a method of cutting such oblique cylindrical tapered surfaces has not been developed in the prior art.

Accordingly, an object of the present invention is to provide a novel electric discharge machining control method which enables a corner portion to be cut to a tapered surface having the shape of an oblique cylinder.

SUMMARY OF THE INVENTION

The present invention, in order to cut the corner portion at the intersection of first and second tapered surfaces into a tapered surface of an oblique cylindrical shape, includes the steps of entering the radius of the oblique cylindrical tapered surface in addition to positional control information which is necessary for cutting the first and second tapered surfaces, computing points Q; R, using the positional control information and radius, on a commanded path where the tapered surface of oblique cylindrical shape is in surface contact with the first and second tapered surfaces, and controlling the relative movement between the workpiece and wire and the movement of the upper guide or lower guide on the basis of the first tapered surface positional control information up to the point Q, then along an arc QR from point Q to point R, and thereafter on the basis of the second tapered surface positional control information from the point R onward.

DESCRIPTION OF THE PREFERRED EMBODIMENT

An embodiment of the present invention will be described in detail in conjunction with the drawings.

Figure 1:
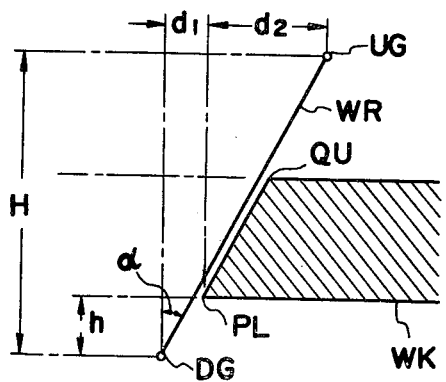
FIG. 1 is an illustrative view for describing taper cutting.
Figure 2:
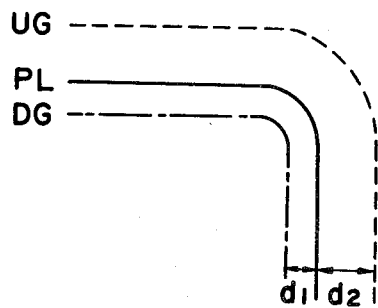
FIG. 2 is an illustrative view showing the paths of upper and lower guides during taper cutting, as well as the programmed profile.
Figure 3:
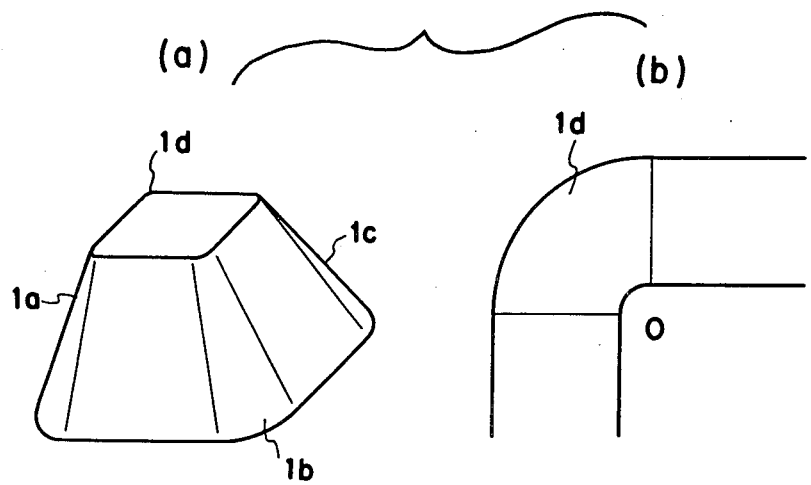
FIG. 3 is an illustrative view or describing a case where corner portions are cut into the form a conical tapered surface.
Figure 4:
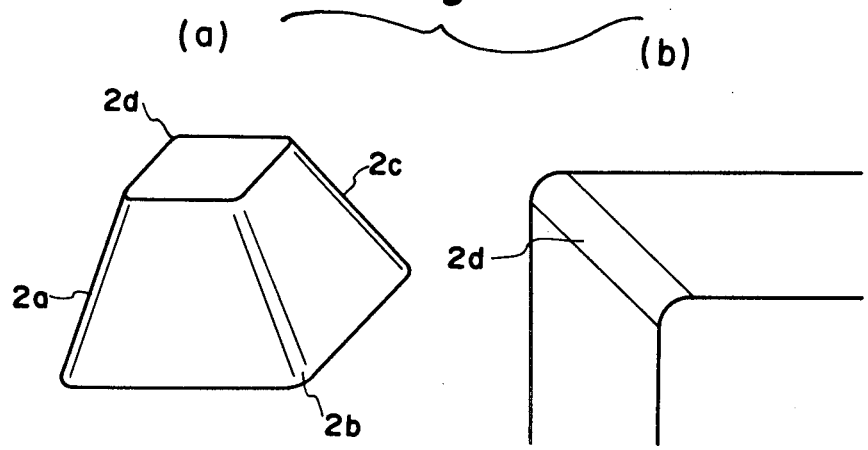
FIG. 4 is an illustrative view for describing a case where corner portions are cut into the form of a tapered surface of oblique cylindrical shape.
Figure 5:
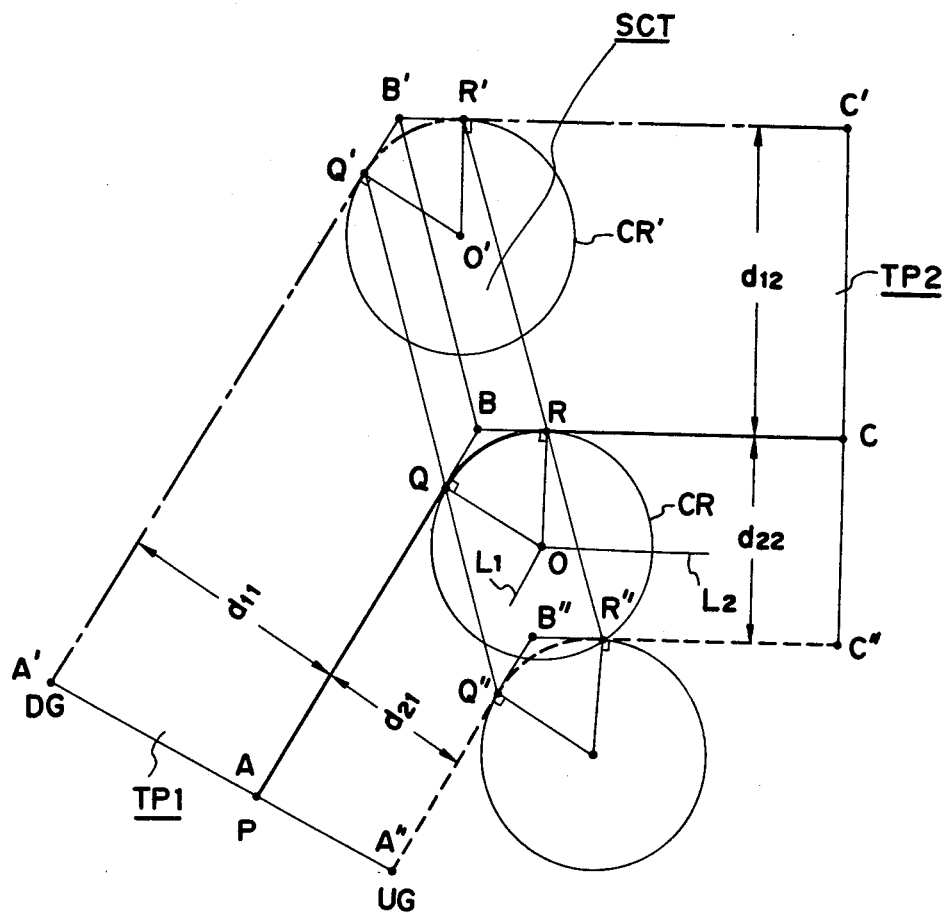
FIG. 5 is an illustrative view for describing a method of cutting a tapered surface of oblique cylindrical shape according to the present invention.

FIG. 5 is an illustrative view for describing a method of cutting a tapered surface of oblique cylindrical shape according to the present invention.

In the Figure, the heavy solid line represents the programmed profile of the lower surface of the workpiece, the dotted line indicates the path of the upper guide UG, and the one-dot chain line indicates the path of the lower guide DG. Here we will consider a case where the corner portion of a first tapered surface $TP_1$ and a second tapered surface $TP_2$ is formed into a tapered surface SCT in the shape of an oblique cylinder of radius r.

In the taper cutting of the profile formed by the first and second tapered surfaces $TP_1$ and $TP_2$, which intersect at an angle at the corner portion, traverse commands along the line segments AB and BC are given in addition to the distance H between the upper guide UG and lower guide DG, the distance h from the lower surface of the workpiece to the lower guide, and the taper angle a. The traverse commands are given by incremental commands. If the components of line segment AB on the X and Y axes are given by $(x_1, y_1)$ and the components of line segment BC are given by $(x_2, y_2)$, respectively, then the commands from a paper tape will be:

$$G01\ X x_1\ Y y_1 * \quad (3)$$
$$X x_2\ Y y_2 *$$

G01 signifies linear interpolation, and "*" signifies end-of-block.

However, in a case where the corner portion of the first tapered surface $TP_1$ and second tapered surface $TP_2$ is to be cut into a tapered surface having the shape of an oblique cylinder, then the commands from the input medium such as the paper tape will be:

$$G01\ X x_1\ Y y_1\ Rr* \quad (4)$$
$$X x_2\ Y y_2 *$$

with processing being executed as described hereinbelow. Note that r is the arc radius of the oblique cylindrical profile.

The first step is to find the coordinates that specify the center 0 of the circle CR, of radius r, that touches the line segments AB, BC from within, the line segments being given by (4) above. The coordinates of center 0 are found as the coordinates of the point of intersection between a straight line $L_1$ which is parallel to the line segment AB and distanced therefrom by r, and a straight line $L_2$ which is parallel to the line segment BC and distanced therefrom by r.

Next the coordinates of intersection points Q, R where the line segments AB, BC intersect the respective perpendiculars dropped from the center 0 are found.

The line segments A'B', B'C', which define the path of the lower guide, are also found. Line segment A'B' is a straight line parallel to line segment AB, and is distanced from AB by an amount of offset $d_{11}$ obtained from Eq. (1). Likewise, line segment B'C' is a straight line parallel to the segment BC and is distanced from BC by an amount of offset $d_{12}$ obtained from Eq. (1). If the taper angles of the first and second tapered surfaces $TP_1$, $TP_2$ are given by $a_1$ and $a_2$, respectively, then the offsets $d_{11}$, $d_{12}$ become:

$$d_{11} = h \cdot \tan a_1$$

$$d_{12} = h \cdot \tan a_2$$

(neglecting the width of the cut).

When the line segments A'B', B'C' have been obtained, the same method that was used to find the coordinates of the center 0 is applied to find the coordinates that specify the center 0' of a circle CR' of radius r, that touches both of these line segments from within. Then the intersection points Q', R' where the line segments A'B', B'C' intersect the respective perpendiculars dropped from the center 0' are obtained.

When Q, R and Q', R' have been obtained as described above, the first tapered face $TP_1$ is cut first in accordance with a method which will now be described. Specifically, using the coordinate values of points A, A' and Q, Q', a workpiece travel vector $VT_1$ and upper guide travel vector $VG_1$ are found through a method which will be described later. Workpiece drive motors are driven according to the X- and Y-axis components $(\Delta X_1, \Delta Y_1)$ of the workpiece travel vector $VT_1$ to transport the workpiece and, at the same time, upper guide motors are driven according to the U- and V-axis components $(\Delta U_1, \Delta V_1)$ of the upper guide travel vector $VG_1$ to transport the upper guide. These operations complete the cutting of the first tapered surface $TP_1$.

Next, with the wire held stationary, the workpiece is transported from point Q to point R along the arc QR of radius r, whereby the tapered surface SCT of the oblique cylindrical shape is cut.

The second tapered surface $TP_2$ is cut following completion of the cutting operation for the oblique cylindrical tapered surface SCT. Specifically, the workpiece travel vector $VT_2$ and upper guide travel vector $VG_2$ for the second tapered surface $TP_2$ are found using the coordinate values of R, R' and C, C'. Then, using $VT_2$, $VG_2$, the workpiece and upper guide are transported to cut the second tapered surface $TP_2$, as described above in connection with the first tapered surface $TP_1$.

Described next will be the method of computing a workpiece travel vector VT and upper guide travel vector VG for the tapered surfaces $TP_1$, $TP_2$.

Figure 6:
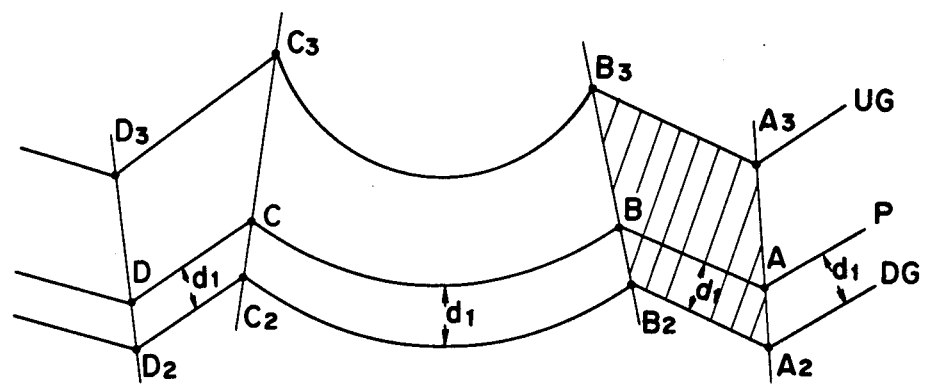
FIG. 6 is an illustrative view for describing the paths of upper and lower guides for a case where a profile comprising a combination of straight lines and an arc is the programmed profile.
Figure 7:
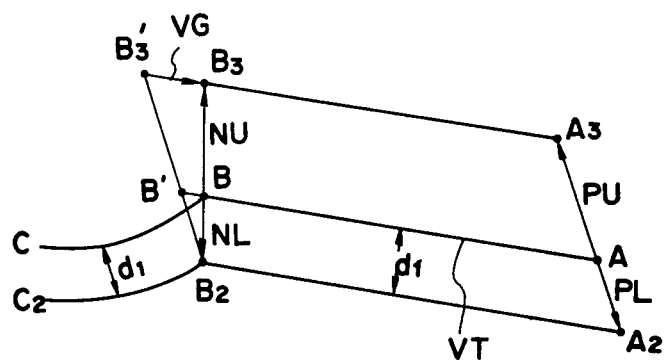
FIG. 7 is an illustrative view for describing a method of computing a workpiece travel vector VT and an upper guide travel vector VG.

FIG. 6 is an illustrative view for describing the paths of the upper and lower guides for a case where a profile comprising a combination of straight lines and an arc (where the taper angle is held constant) is the programmed profile. FIG. 7 is an illustrative view for describing a method of computing a workpiece travel vector VT and an upper guide travel vector VG.

In FIG. 6, A, B, C and D represent points on the cut profile of the lower surface of the workpiece (though the points may just as well lie on the upper surface of the workpiece). The straight lines and the arc that interconnect these points are instructed as the programmed profile. In accordance with the programmed profile AB, the path of the upper guide UG is $\overrightarrow{A_3B_3}$, and the path of the lower guide DG is $\overrightarrow{A_2B_2}$.

Reference will now be had to FIG. 7 to describe the method of computing the workpiece travel vector VT and upper guide travel vector VG for the case where the tapered surface indicated by the hatched lines in FIG. 7 is cut.

It is already known that the starting point offset vector PL ($=\overrightarrow{AA_2}$), at the starting point A of the programmed profile (straight line) $\overrightarrow{AB}$, is equal to the end point offset vector at the end of the previous block of the lower guide DG. Also, the starting point offset vector PU ($=\overrightarrow{AA_3}$) is the end point offset vector at the end of the previous block of the upper guide UG. This, too, is already known.

Accordingly, if we find the end point offset vectors NL ($=\overrightarrow{BB_2}$), NU ($=\overrightarrow{BB_3}$), at the end point B of straight line $\overrightarrow{AB}$, to the lower guide and upper guide, then the workpiece travel vector VT ($=\overrightarrow{AB'}$) and upper guide travel vector VG ($=\overrightarrow{B_3B_3'}$) can be calculated from the following equations:

$$VT = AB + NL - PL \quad (5)$$

$$VG = (PU - PL) - (NU - NL) \quad (6)$$

The coordinates of point $B_2$ can be found as the point of intersection between the straight line $\overline{A_2B_2}$, which is parallel to straight line AB and distanced therefrom by the amount of offset $d_1$, and the arc $\overline{B_2C_2}$, which is concentric with arc $\overline{BC}$ and differs therefrom by the amount of offset $d_1$. Moreover, point B is a commanded point and therefore known. The end point offset vector NL ($=\overrightarrow{BB_2}$) to the lower guide is obtained as a result. It should be noted that the points B, $B_2$ correspond to the points Q, Q' in FIG. 5. Thus, the end point offset vector NL to the lower guide in FIG. 5 is $\overrightarrow{QQ'}$.

On the other hand, since the ratio of NU to NL is equivalent to the ratio of PU to PL, the end point offset vector NU to the upper guide can be found from:

$$NU = \overrightarrow{BB_3} = -NL \cdot \left| \frac{PU}{PL} \right| \quad (7)$$

It should be noted that point $B_3$ corresponds to point Q'' in FIG. 5. Accordingly, the end point offset vector NU to the upper guide is $\overrightarrow{QQ''}$ in FIG. 5.

Next, assuming that the points corresponding to A and $A_3$ will be B' and B'$_3$ when the straight line $\overline{A_2A_3}$ is translated along the stright line OVS/AB/ so that the point $A_2$ arrives at the point $B_2$, the workpiece travel vector VT and upper guide travel vector VG will be given by:

$$VT = \overrightarrow{AB} + \overrightarrow{BB'} = \overrightarrow{A_2B_2} \quad (5)'$$

$$VG = \overrightarrow{B'_3B_3}$$

These vectors VT, VG will take on the form of Eqs. (5) and (6) if expressed using the starting point and end point offst vectors PU, PL, NU, NL and NB. The electric discharge machining of the tapered surface indicated by the hatched lines in FIG. 6 can be performed if table drive motors MX, MY are driven according to the respective X- and Y-axis components ($\Delta X$, $\Delta Y$) of the workpiece travel vector VT and upper guide drive motors MU, MV are driven according to the respective X- and Y-axis components ($\Delta U$, $\Delta V$) of the upper guide travel vector VG.

Figure 8:
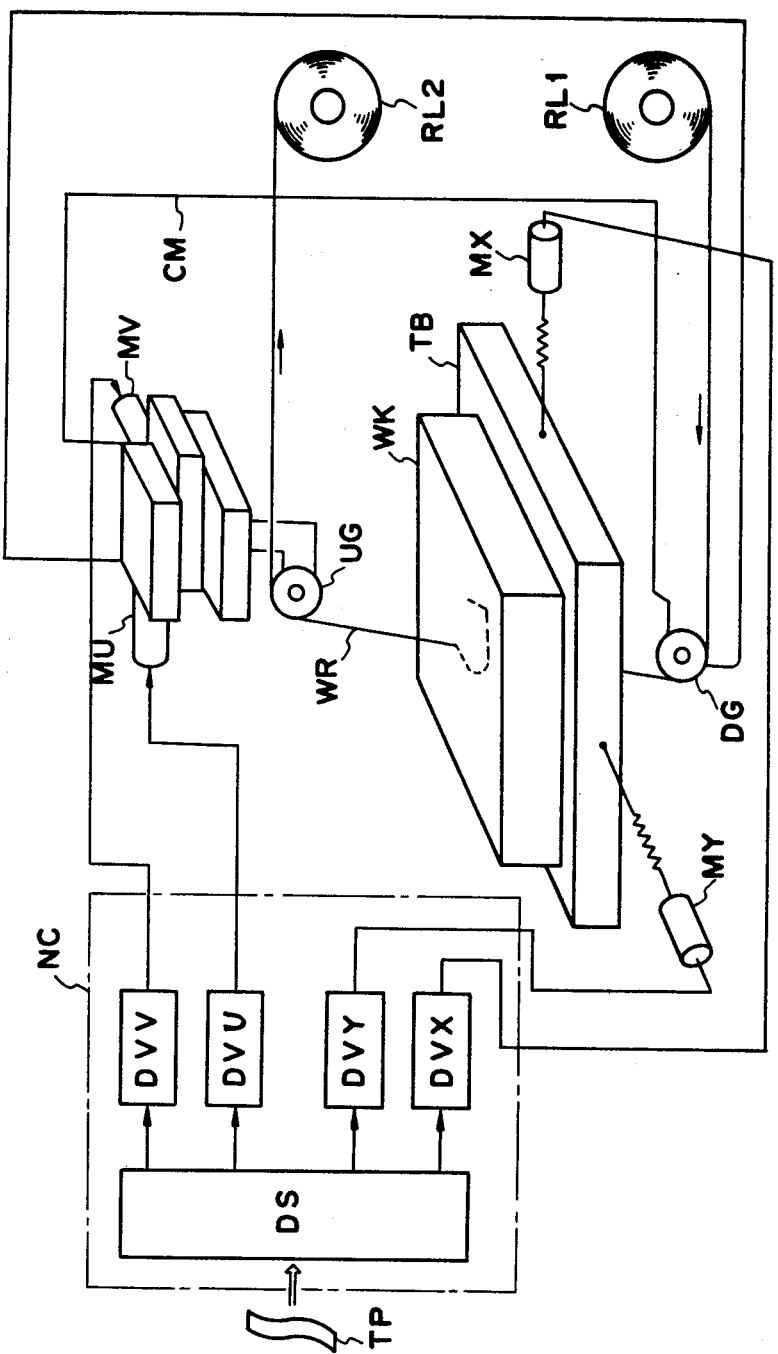
FIG. 8 is a simplified illustrative view for describing a four-axis control wire-cut electric discharge machine to which the present invention can be applied.

FIG. 8 is a simplified illustrative view of a four-axis control wire-cut electric discharge machine to which the present invention can be applied. The workpiece WK is affixed on an XY table TB which is transported in the X and Y directions by motors MX, MY, respectively. The wire WR, meanwhile, is taken up by a reel $RL_2$ and supplied with a voltage by a contacting electrode, not shown, while being payed out by a reel $RL_1$ and tensioned between the lower guide DG and upper guide UG. An electrical discharge is produced between the wire WR and the workpiece WK. The upper guide UG is provided on a column CM and is capable of being moved in the X and Y directions by motors MU, MV, respectively. The motors MX, MY, MU, MV are driven by respective drive circuits DVX, DVY, DVU, DVV of a numerical control device NC. Distribution processing for each axis is performed by a distribution circuit DS when the contents of a command tape TP are read.

Figure 9:
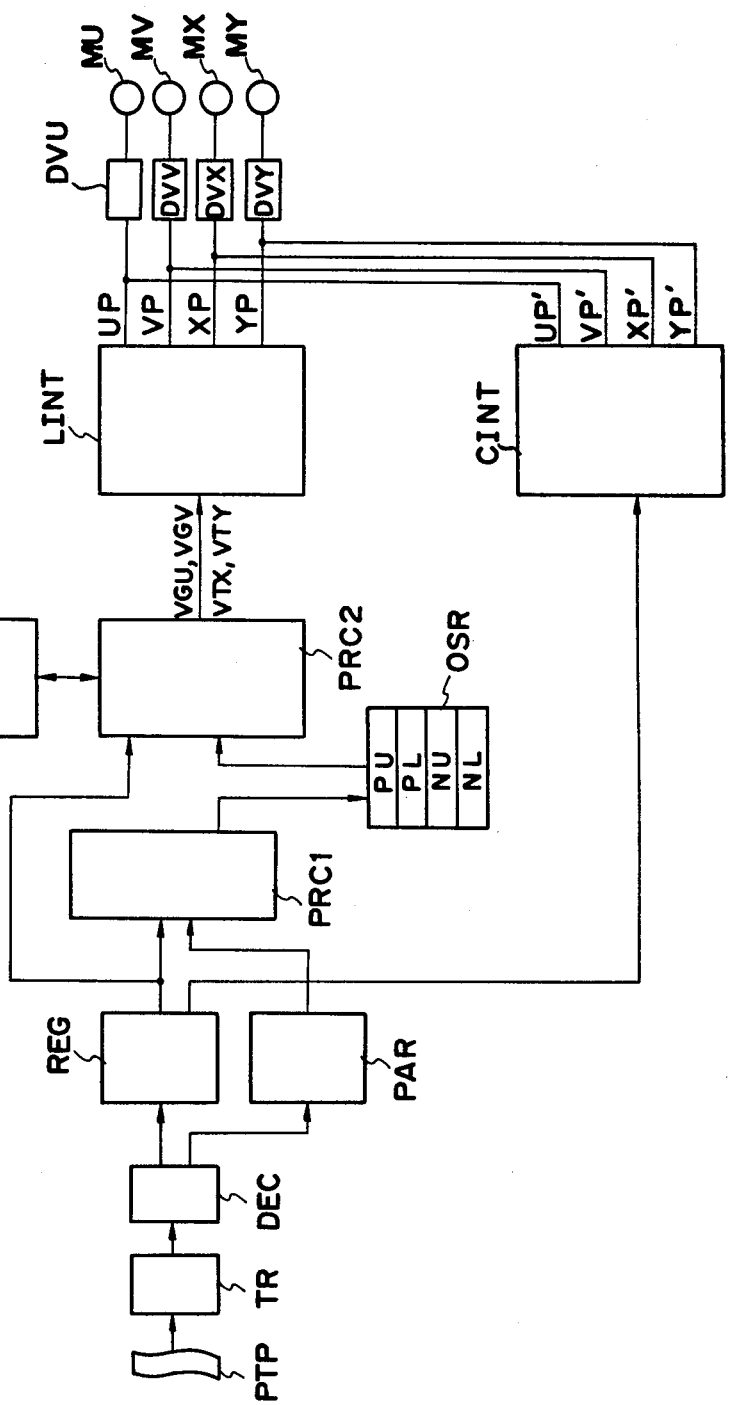
FIG. 9 is a block diagram showing the principal portions of a numerical control device for practicing the electric discharge control method of the present invention.

FIG. 9 is a block wiring diagram showing the prinicipal portions of a numerical control device for practicing the electric discharge machining method of the present invention. PTP represents a paper tape in which numerical control information is punched, TR a tape reader for reading the information punched in the paper tape PTP, DEC a decoder for decoding the information read from the paper tape PTP, REG a register, and PAR a parameter storage register for storing taper angles $a_1$, $a_2$, the distance H between the upper and lower guides, the distance h between the lower surface of the workpiece and the lower guide, etc. $PRC_1$ is an arithmetic circuit. When the traverse commands given by (4) above are read in from the paper tape PTP by the tape reader TR, the arithmetic circuit $PRC_1$, using the axis components ($x_1$, $y_1$), ($x_2$, $y_2$) of each line segment, the radius r, taper angles $a_1$, $a_2$ and distances H, h, finds Q, Q', R, R' in accordance with the above-described sequence, and computes the starting point offset vectors PU, PL and end point offset vectors NU, NL. OSR represents an offset register for storing the starting point and end point offset vectors. $PRC_2$ is an arithmetic circuit for computing the workpiece travel vector VT and upper guide travel vector VG using the starting point and end point offset vectors PU, PL, NU, NL and the traverse commands, and for computing the components ($\Delta X$, $\Delta Y$), ($\Delta U, \Delta V$) of VT, VG on each axis. VRG designates a vector register for storing the workpiece travel vector VT and the upper guide travel vector VG. LINT is a pulse distributing circuit which executes a pulse distributing operation (linear interpolation) on the basis of the axis components ($\Delta X$, $\Delta Y$), ($\Delta U$, $\Delta V$) of the vectors VT, VG to generate distributed pulses $X_p$, $Y_p$, $U_p$, $V_p$. CINT represents a circular interpolator, DVX, DVY, DVU, DVV denote servo control circuits for the X, Y, U and V axes, respectively, and MU, MV, MX, MY represent the servo motors for each axis.

Next, the operation of FIG. 9 will be described for a case where a workpiece is taper cut to the profile shown in FIG. 5.

When the two blocks of commands given by (4) above are read from the paper tape PTP by the tape reader TR, the commands are decoded by the decoder DEC and then set in register REG. Assume that such parameters as the taper angles $a_1$, $a_2$, the distance H between the upper guide UG and lower guide DG, and the distance h between the lower guide DG and the lower surface of the workpiece WK, have already been set in the parameter storage register PAR. Note, however, that the taper angles $a_1$, $a_2$ ordinarily are instructed at the same time as the numerical control command data. Also, the offset register OSR stores the end point offset vectors (equal to the starting point offset vectors of the tapered surface $TP_1$) PU, PL of the previous block.

The arithmetic circuit $PRC_1$ finds the end points Q, Q' of the first tapered surface $TP_1$ by using the traverse commands $(x_1, y_1), (x_2, y_2)$, the radius r and the information stored in the parameter setting register PAR. Consequently, the end point offset vector NL $(=\overline{QQ'})$ to the lower guide is obtained and, from Eq. (7), the end point offset vector NU $(=\overline{QQ''})$ to the upper guide is obtained. The end point offset vectors NL, NU are stored in the offset register OSR. The end point offset vectors of the previous block become the starting point offset vectors PU, PL of the first tapered surface $TP_1$.

After the offset vectors have been found the arithmetic circuit $PRC_2$ uses Eqs. (5) and (6) to find the workpiece travel vector VT and upper guide travel vector VG and sets VT, VG in the vector register VRG.

Next, arithmetic circuit $PRC_2$ finds the X and Y axis components VTX, VTY from the vector VT set in the vector register, and the U and V axis components VTU, VTV from the vector VG, and delivers these components to the pulse distributor LINT. The pulse distributor LINT, upon receiving VTX, VTY, VTU, VTV, immediately executes pulse distributing operations (linear interpolations) simultaneously along four axes to apply distributed pulses $X_p, Y_p, U_p, V_p$ to the servo control circuits DVX, DVY, DVU, DVV, respectively. Accordingly, the servo motors MX, MY, MU, MV are rotated by a known method to transport the workpiece and move the upper guide.

When the taper cutting of the first tapered surface $TP_1$ is completed, the register REG supplies the circular interpolator CINT with circular interpolation information (radius r, axis components from starting point Q to center 0, and axis components from starting point Q to end point R), whereby the circular interpolator CINT starts circular interpolation to generate X- and Y-axis interpolation pulses XP', YP' which are applied to the servo control circuits DVX, DVY, respectively. As a result, the servo motors MX, MY are rotated to transport the workpiece along the arc QR. This control operation completes the taper cutting of the oblique cylindrical profile.

When the machining of the oblique cylindrical profile is completed, the starting point offset vectors PU $(=\overline{RR''})$, PL $(=\overline{RR'})$ and the end point offset vectors NU $(=OVS/CC/'')$, NL $(=\overline{CC'})$ are found, and the second tapered surface $TP_2$ is cut in the same manner as the first tapered surface. It should be noted that the starting point offset vector of the second tapered surface $TP_2$ is equal to the end point offset vector of the first tapered surface $TP_1$.

In the foregoing, a case is described in which the upper guide is moved along the U and V axes and the workpiece along the X and Y axes to achieve taper cutting along four axes simultaneously. It is possible, however, to move the lower guide along with the workpiece. Also, the upper surface of the workpiece may be taken as the programmed profile, rather than the lower surface of the workpiece.

In accordance with the present invention, a corner portion can be taper cut into the shape of an oblique cylindrical profile through a simple method, enabling an improvement in the performance of an electric discharge machine.

What is claimed is:

1. A wire-cut electric discharge machining control method for taper cutting a workpiece to provide a tapered surface of oblique cylindrical shape between a first tapered surface lying in a first plane and an adjacent second tapered surface lying in a second plane that intersects said first plane by moving the workpiece in a third plane relative to the wire, the first plane intersecting the third plane at a predetermined taper angle and the second plane intersecting the third plane at substantially the same taper angle, and moving an upper or lower guide from which the wire is stretched in a fourth plane that is substantially parallel to the third plane, said tapered surface of oblique cylindrical shape being configured as a portion of a cylinder having an axis which extends through said third plane and is parallel to both said first and second planes and having a surface which is tangent to both said first and second planes, comprising the steps of: entering command data corresponding to the radius of said oblique cylindrical tapered surface in addition to positional control information for cutting the first and second tapered surfaces into anumerical control device; determining points Q and R on a commanded path lying in said third plane where the tapered surface of oblique cylindrical shape comes into tangential contact with the first and second tapered surfaces, respectively, using said positional control information and radius; and taper cutting to provide the tapered surface having an oblique cylindrical shape by cutting the first tapered surface until the wire arrives at said point Q, then cutting the oblique cylindrical tapered surface by moving the workpiece along the arc QR with the wire held fixed, and subsequently cutting the second tapered surface from point R.

2. A wire-cut electric discharge machining control method according to claim 1, wherein the step of cutting each of said first and second tapered surfaces includes the steps of determining an upper guide travel vector VG and a workpiece travel vector VT using starting point offset vectors PU and PL from the intersection of the third plane and a line running through the upper and lower guides before the tapered surface is cut to the upper guide and lower guide, respectively, end point offset vectors NU and NL from the intersection of the third plane and a line running through the upper and lower guides after the tapered surface is cut to the upper guide and lower guide, respectively, and a vector from the intersection of the third plane and a line running through the upper and lower guides before the tapered surface is cut and the intersection of the third plane and a line running through the upper and lower guides after the tapered surface is cut; finding the orthogonal components of the upper guide travel vector VG and of the workpiece travel vector VT and performing a linear pulse distribution operation on the basis of the axis components; and moving the upper guide and workpiece in accordance with the distributed pulses.

3. A method for taper cutting a workpiece mounted for movement in a plane, by producing an electric discharge between the workpiece and a wire electrode while moving the workpiece with respect to the electrode along a command path which includes first and second angularly disposed lines lying in said plane, in order to provide a tapered surface of oblique cylindrical shape between a first tapered plane surface in which said first line lies and a second tapered plane surface in which said second line lies, said tapered surfce of oblique cylindrical shape being configured as a portion of a cylinder having an axis that is parallel to both said first and second plane tapered surfaces and a surface that is tangent to both said first and second plane tapered surfaces, said wire extending between a fixed guide on one side of the workpiece and a guide mounted for movement in a plane parallel to the plane of workpiece movement on the other side of the workpiece, comprising the steps of:

entering command data corresponding to the radius of the oblique cylindrical tapered surface, and positional control information for cutting along the command path to provide the first and second tapered plane surfaces, into a numerical control device;

determining a point Q on the first line where the first tapered plane surface contacts the oblique cylindrical tapered surface and a point P on the second line where the second tapered plane surface contacts the oblique cylindrical tapered surface;

cutting the first tapered plane surface by producing an electric discharge while moving the workpiece and moving the movable guide to bring the wire electrode to a position wherein it passes through the point Q and wherein it is parallel to the axis of the oblique cylindrical tapered surface;

cutting the oblique cylindrical tapered surface by producing an electrical discharge while moving the workpiece along the arc QP and holding the movable guide still; and cutting the second tapered plane surface.

4. The method of claim 3, wherein the step of cutting the first tapered plane surface comprises the step of determining a movable guide travel vector based upon at least one of a first starting point offset vector extending from the intersection of the wire electrode and the plane of workpiece movement to the movable guide prior to the cutting of the first tapered surface, a second starting point offset vector extending from the intersection of the wire electrode and the plane of workpiece movement to the fixed guide prior to the cutting of the first tapered surface, a first end point offset vector extending from the intersection of the wire electrode and the plane of workpiece movement to the movable guide after the cutting of the first tapered surface, and a second end point offset vector extending from the intersection of the wire electrode and the plane of workpiece movement to the fixed guide after the cutting of the first tapered surface.

5. The method of claim 4, wherein the step of determining a movable guide travel vector is accomplished by subtracting the difference between the first and second end point offset vectors from the difference between the first and second starting point offset vectors.

6. The method of claim 4, wherein the step of cutting the first tapered plane surface additionally comprises the step of determining a workpiece travel vector based on at least one of the first and second starting point offset vectors and the first and second end point offset vectors.

7. The method of claim 6, wherein the step of determining the workpiece travel vector is accomplished by adding the difference between the second end point offset vector and the second starting point offset vector to a vector extending from the intersection of the wire electrode and the plane of workpiece movement prior to the cutting of the first tapered plane surface to the intersection of the wire electrode and the plane of workpiece movement after the cutting of the first tapered plane surface.

* * * * *

UNITED STATES PATENT AND TRADEMARK OFFICE
CERTIFICATE OF CORRECTION

PATENT NO. : 4,467,166

DATED : August 21, 1984

INVENTOR(S) : Gamo et al.

It is certified that error appears in the above-identified patent and that said Letters Patent is hereby corrected as shown below:

Column 2, line 37, "Q;" should be -- Q and --.
Column 5, line 5, "AB," should be -- $\overline{AB}$, --.
line 26, "VT = AB + NL - PL" should be
-- VT = $\overline{AB}$ + NL - PL --.
line 54, "OVS/AB/" should be -- $\overline{AB}$ --.
Column 7, line 60, "(= OVS/CC/")" should be -- (= CC") --.
Column 8, line 32, "anumerical" should be -- a numerical --.
Column 9, line 10, "surfce" should be -- surface --.

Signed and Sealed this

Sixth Day of August 1985

[SEAL]

Attest:

DONALD J. QUIGG

Attesting Officer     Acting Commissioner of Patents and Trademarks